US012644498B2

(12) United States Patent
An

(10) Patent No.: US 12,644,498 B2
(45) Date of Patent: Jun. 2, 2026

(54) ANTI-VIBRATION DEVICE

(71) Applicant: Prospira Corporation, Kawasaki city (JP)

(72) Inventor: Zhixu An, Kawasaki city (JP)

(73) Assignee: Prospira Corporation, Kawasaki city (JP)

( * ) Notice: Subject to any disclaimer, the term of this patent is extended or adjusted under 35 U.S.C. 154(b) by 187 days.

(21) Appl. No.: 18/560,101

(22) PCT Filed: Nov. 17, 2021

(86) PCT No.: PCT/JP2021/042317
§ 371 (c)(1),
(2) Date: Nov. 10, 2023

(87) PCT Pub. No.: WO2022/239272
PCT Pub. Date: Nov. 17, 2022

(65) Prior Publication Data
US 2024/0240690 A1 Jul. 18, 2024

(30) Foreign Application Priority Data

May 12, 2021 (JP) ................................. 2021-081279

(51) Int. Cl.
*F16F 15/08* (2006.01)
(52) U.S. Cl.
CPC ........ *F16F 15/08* (2013.01); *F16F 2224/025* (2013.01)
(58) Field of Classification Search
CPC ..... F16M 11/22; F16M 2200/08; F16F 15/08; F16F 2224/025; F16F 1/3863; F16F 1/54
(Continued)

(56) References Cited

U.S. PATENT DOCUMENTS

2008/0164114 A1* 7/2008 Kawashima .......... F16F 1/3849
188/379
2012/0181412 A1* 7/2012 Rodecker ............ F01N 13/1805
248/634
(Continued)

FOREIGN PATENT DOCUMENTS

JP 2006226469 A 8/2006
JP 2014173692 A 9/2014
(Continued)

OTHER PUBLICATIONS

Apr. 28, 2025, search result of the Extended European Search Report issued by the European Patent Office in the corresponding European Patent Application No. 21942000.7.
(Continued)

*Primary Examiner* — Alfred J Wujciak
(74) *Attorney, Agent, or Firm* — KENJA IP LAW PC

(57) ABSTRACT

An anti-vibration device (1A) including: a bracket (2) having a fixing portion (21) and a bridge portion (22) that together with the fixing portion (21) forms an opening (A); a mounting member (3) mounted in the opening (A) formed in the bracket (2); and an elastic shaft (41) that is mounted to the mounting member (3) and extends in an axial direction inside the opening (A). The mounting member (3) has a circumferential wall (31) surrounding the elastic shaft (41) in a circumferential direction. The circumferential wall (31) has one or more recesses extending in the axial direction at one or more locations along the circumferential direction.

20 Claims, 8 Drawing Sheets

(58) Field of Classification Search

USPC ....... 248/559, 560, 562, 564, 566, 570, 571, 248/609, 619, 621, 632, 634, 635, 636, 248/638

See application file for complete search history.

(56) References Cited

U.S. PATENT DOCUMENTS

| | | | |
|---|---|---|---|
| 2014/0367546 A1* | 12/2014 | Hibi | F16F 1/3835 248/635 |
| 2015/0219182 A1* | 8/2015 | Shimada | B60K 5/1208 267/140.5 |
| 2015/0240901 A1 | 8/2015 | Ishikawa et al. | |
| 2015/0252870 A1* | 9/2015 | Kashihara | F16M 13/02 248/634 |
| 2017/0074348 A1* | 3/2017 | Okajima | F16F 1/3849 |
| 2019/0255931 A1 | 8/2019 | Kato et al. | |

FOREIGN PATENT DOCUMENTS

| | | |
|---|---|---|
| JP | 2014185690 A | 10/2014 |
| JP | 2015169289 A | 9/2015 |
| JP | 2016080012 A | 5/2016 |
| JP | 2017067156 A | 4/2017 |
| WO | 2011148576 A1 | 12/2011 |

OTHER PUBLICATIONS

Feb. 1, 2022, International Search Report issued in the International Patent Application No. PCT/JP2021/042317.

Nov. 14, 2023, International Preliminary Report on Patentability issued in the International Patent Application No. PCT/JP2021/042317.

Jan. 12, 2026, search result of Office Action issued by the China National Intellectual Property Administration in the corresponding Chinese Patent Application No. 202180098086.4.

* cited by examiner

ANTI-VIBRATION DEVICE

TECHNICAL FIELD

The present disclosure relates to an anti-vibration device.

BACKGROUND

Conventional anti-vibration devices include devices in which a mounting member is press-fitted through an elastic body into an opening formed in a bracket, and the mounting member and the bracket are connected by an elastic shaft (see, for example, Patent Literature (PTL) 1). This secures the spring characteristics of the mounting member in a press-fit direction (direction of extension of the opening).

CITATION LIST

Patent Literature

PTL 1: JP 2015-169289 A

SUMMARY

Technical Problem

However, in the conventional anti-vibration device described above, the elastic shaft is provided to a recess formed in the mounting member. Therefore, when attempts have been made to improve the spring characteristics in the press-fit direction of the conventional anti-vibration device described above, by securing a large cross-sectional area of the elastic shaft, for example, a problem has been observed that the elastic shaft easily comes into contact with the inner wall of the recess when the bracket and the mounting member are in relative motion, such as when a vehicle is in motion, for example.

It would be helpful to provide an anti-vibration device able to secure a large cross-sectional area of the elastic shaft while avoiding contact between the elastic shaft and the mounting member.

Solution to Problem

An anti-vibration device according to the present disclosure comprises: a bracket having a fixing portion that is fixable to either one of a vibration generator and a vibration receiver, and a bridge portion that together with the fixing portion forms an opening; a mounting member that is mountable to the other of the vibration generator and the vibration receiver, and is mounted in the opening formed in the bracket; and an elastic shaft that is mounted to the mounting member and extends in an axial direction inside the opening, wherein the mounting member has a circumferential wall surrounding the elastic shaft in a circumferential direction, and the circumferential wall has one or more recesses extending in the axial direction at one or more locations along the circumferential direction. The anti-vibration device according to the present disclosure is able to secure a large cross-sectional area of the elastic shaft while avoiding contact between the elastic shaft and the mounting member.

In the anti-vibration device according to the present disclosure, the one or more recesses may include a recess having a shape such that the circumferential wall is divided along the circumferential direction. In this case, contact between the elastic shaft and the circumferential wall of the mounting member may be avoided more effectively.

In the anti-vibration device according to the present disclosure, the one or more recesses may include a recess having a shape such that the circumferential wall is connected along the circumferential direction. In this case, rigidity of the circumferential wall may be adjusted by adjusting length in the axial direction of the one or more recesses while avoiding contact between the elastic shaft and the circumferential wall of the mounting member.

In the anti-vibration device according to the present disclosure, the one or more recesses may be disposed at locations opposite each other across the elastic shaft in the direction of extension of the fixing portion of the bracket. In this case, contact between the elastic shaft and the circumferential wall of the mounting member may be avoided in the direction of extension of the fixing portion of the bracket.

In the anti-vibration device according to the present disclosure, the one or more recesses may be disposed opposite the fixing portion of the bracket with the elastic shaft interposed therebetween. In this case, contact between the elastic shaft and the circumferential wall of the mounting member may be avoided at the position opposite the fixing portion of the bracket with the elastic shaft therebetween.

In the anti-vibration device according to the present disclosure, the anti-vibration device is preferably further provided with an elastic body that is integrally formed with the elastic shaft and covers the circumferential wall and the one or more recesses, and the bracket and the mounting member are fitted to each other via the elastic body. In this case, the overall configuration of the anti-vibration device is simplified while also mitigating the impact at the time of contact between the elastic shaft and the circumferential wall of the mounting member when, for example, an excessive load is applied.

Advantageous Effect

According to the present disclosure, the anti-vibration device is provided that is able to secure a large cross-sectional area of the elastic shaft while avoiding contact between the elastic shaft and the mounting member.

DETAILED DESCRIPTION

Figure 1A:
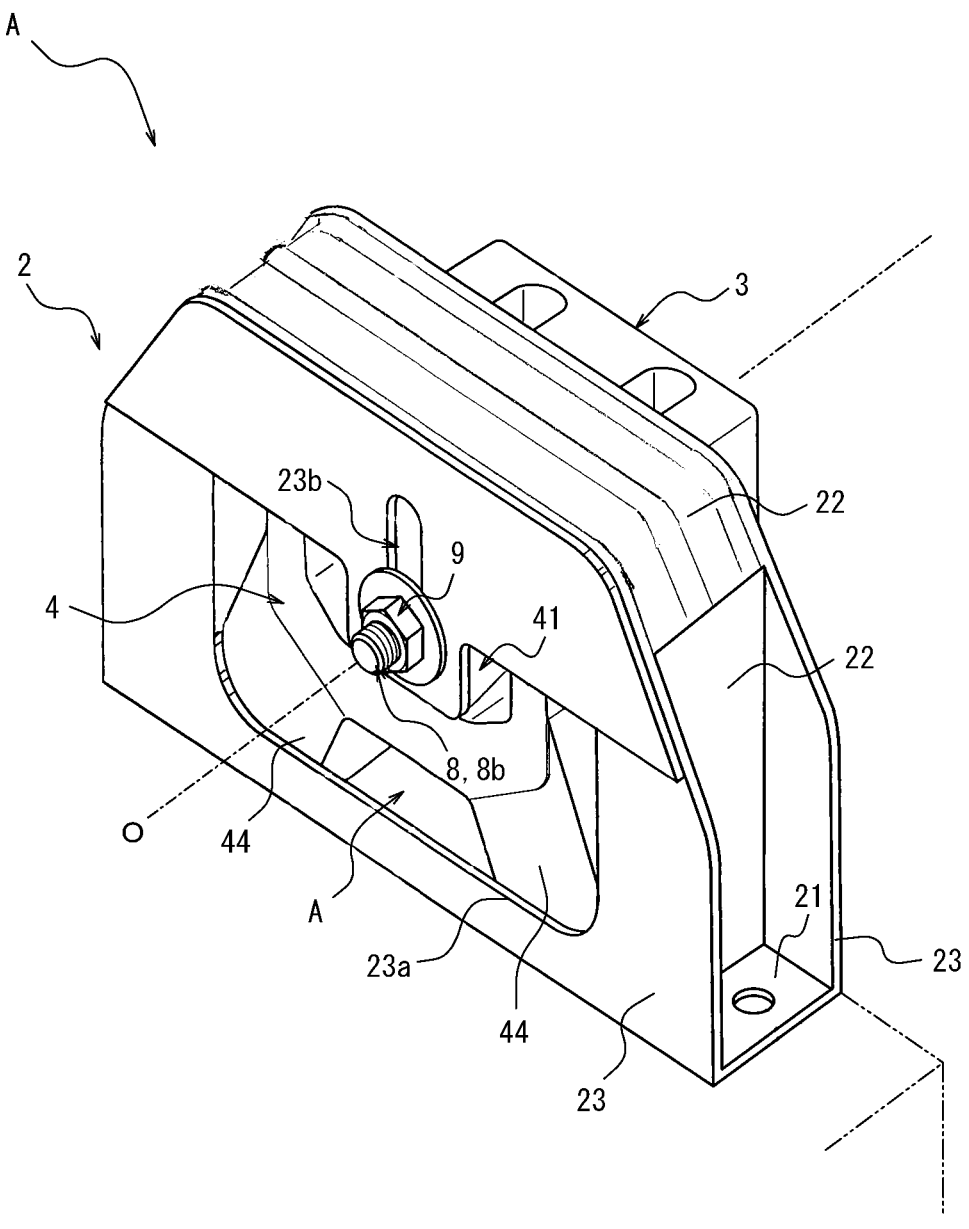
FIG. 1A is a perspective view schematically illustrating an anti-vibration device according to a first embodiment 1 of the present disclosure.

The following is a description of the anti-vibration device according to various embodiments of the present disclosure.

According to the present embodiment, an anti-vibration device 1 includes a bracket 2. The bracket 2 has a fixing portion 21 that is fixable to either one of a vibration generator and a vibration receiver, and a bridge portion 22 that together with the fixing portion 21 forms an opening A. Further, the anti-vibration device 1 includes a mounting member 3. The mounting member 3 is mountable to the other of the vibration generator and the vibration receiver, and is mounted in the opening A formed in the bracket 2. Further, the anti-vibration device 1 includes an elastic shaft 41. The elastic shaft 41 is mounted to the mounting member 3 and extends in the axial direction inside the opening A. That is, the anti-vibration device 1 basically includes the bracket 2, the mounting member 3, and the elastic shaft 41. Further, in the anti-vibration device 1, the mounting member 3 has a circumferential wall 31 surrounding the elastic shaft 41 in the circumferential direction. The circumferential wall 31 has one or more recesses 32 extending in the axial direction at one or more locations along the circumferential direction.

According to the present embodiment, the anti-vibration device 1 is an engine mount that is disposed between an engine (not illustrated) and a vehicle body. According to the present embodiment, the engine corresponds to either one of the vibration generator and the vibration receiver. Further, according to the present embodiment, the car body corresponds to the other one of the vibration generator and the vibration receiver.

In the following description, "axial direction" refers to the direction of extension of the opening A formed in the bracket 2. According to the present embodiment, the central axis O of the anti-vibration device 1 passes through the opening A formed in the bracket 2, the opening A extending parallel to the central axis O. That is, according to the present embodiment, the "axial direction" extends parallel to the central axis O.

According to the present embodiment, the anti-vibration device 1 is disposed so that the central axis O is parallel to the left-right direction of the vehicle when vehicle-mounted. Therefore, in the following description, the axial direction is also referred to as the "left-right direction when vehicle-mounted".

Further, according to the present embodiment, the fixing portion 21 of the bracket 2 has a rectangular shape in plan view. The fixing portion 21 extends in the longitudinal direction. Therefore, the extension direction of the fixing portion 21 (hereinafter, "fixing portion extension direction") is the longitudinal direction of the fixing portion 21. Further, according to the present embodiment, the anti-vibration device 1 is disposed so that the fixing portion 21 of the bracket 2 extends in the front-rear direction of the vehicle when vehicle-mounted. Therefore, in the following description, the fixing portion extension direction is also referred to as the "front-rear direction when vehicle-mounted".

Further, according to the present embodiment, the anti-vibration device 1 is disposed so that the fixing portion 21 of the bracket 2 is on the lower side (the bridge portion 22 of the bracket 2 is on the upper side). Therefore, in the following description, the direction perpendicular to the axial direction and the fixing portion extension direction is also referred to as the "vertical direction when vehicle-mounted".

In FIG. 1A, reference sign 1A indicates an anti-vibration device according to a first embodiment of the present disclosure. Referring to FIG. 1A, the anti-vibration device 1A includes an elastic body 4. The elastic body 4 is made of rubber, for example, and is provided to the mounting member 3. The elastic body 4 may, for example, be injection molded into the mounting member 3 as an insert. The elastic body 4 is disposed in the opening A formed in the bracket 2. According to the present embodiment, the bracket 2 and the mounting member 3 are fitted to each other via the elastic body 4.

According to the present embodiment, the bracket 2 and the mounting member 3 are connected via the elastic shaft 41. According to the present embodiment, the elastic shaft 41 is integrally formed with the elastic body 4. According to the present embodiment, the elastic shaft 41 is connected to the mounting member 3 as part of the elastic body 4.

Figure 1B:
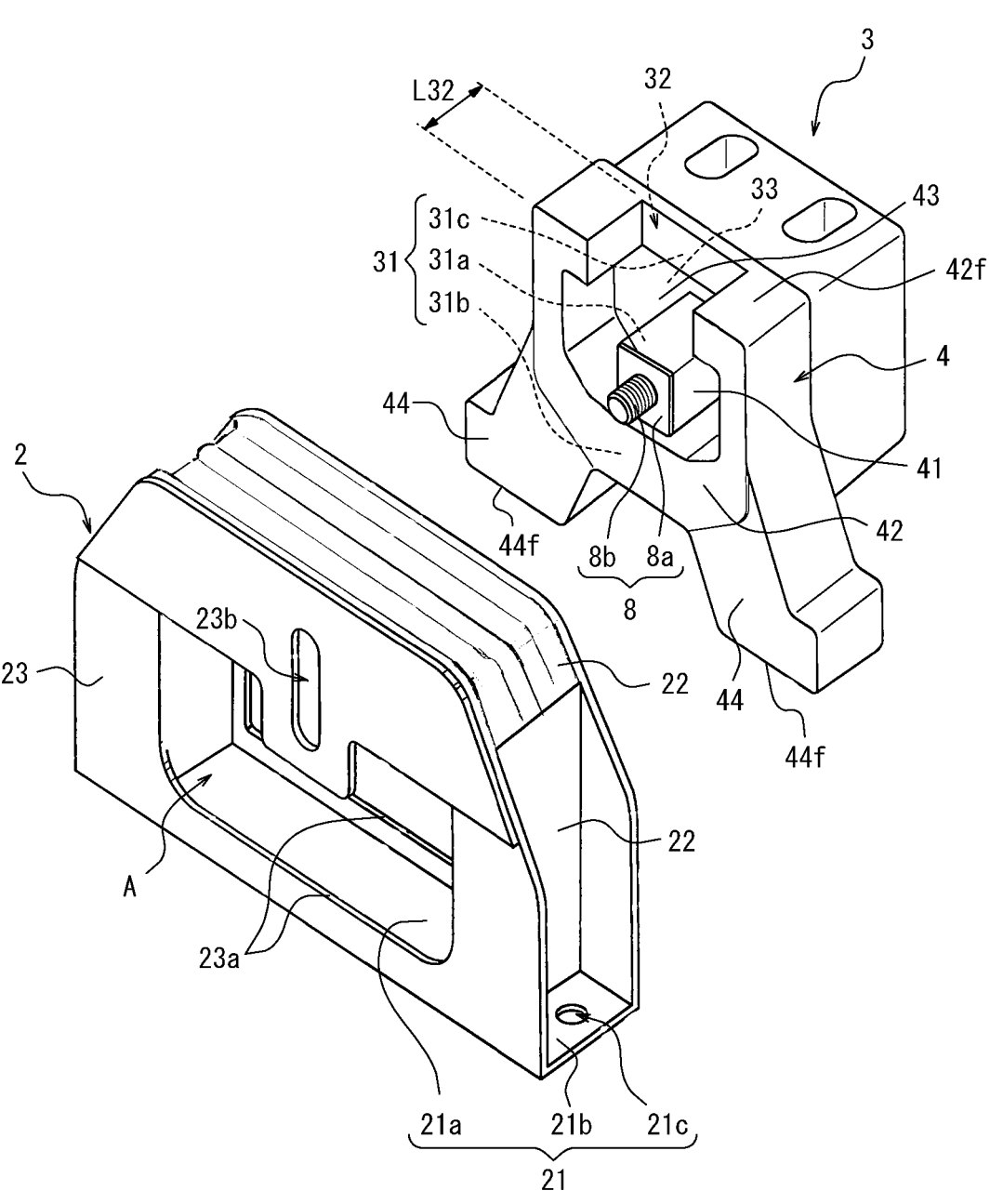
FIG. 1B is a perspective view illustrating the anti-vibration device of FIG. 1 disassembled into a bracket and a mounting member with an elastic body.

Referring to FIG. 1B, a tip of the elastic shaft 41 is provided with a connecting portion 8. According to the present embodiment, the connecting portion 8 has a fixing portion 8a that is plate-shape and a connecting portion body 8b integrally formed with the fixing portion 8a. According to the present embodiment, the connecting portion body 8b is composed of a screw. The connecting portion 8 may be made integral with the elastic body 4, for example, by injection molding the elastic body 4 with respect to the connecting portion 8.

On the other hand, the bracket 2 may be made of resin (for example, fiber-reinforced plastic), metal, or the like. Referring to FIG. 1B, the opening A in the bracket 2 is formed by the fixing portion 21 and the bridge portion 22. According to the present embodiment, the fixing portion 21 has a bottom portion 21a that together with the bridge portion 22 demarcates the opening A, and two flanges 21b that extend outward from the bottom portion 21a. According to the present embodiment, fixing holes 21c are formed in the flanges 21b.

Further, according to the present embodiment, the bracket 2 has two side walls 23. The two side walls 23 are spaced apart in the axial direction. The side walls 23 are each fixed to the fixing portion 21 and the bridge portion 22. According to the present embodiment, windows 23a are formed in the side walls 23. According to the present embodiment, the windows 23a have a smaller cross-sectional area than the opening A. Further, a connection hole 23b is formed in the side walls 23 for passage of the connecting portion body 8b.

The mounting member 3 may be made of metal (aluminum alloy) or the like, for example. Referring back to FIG. 1A, according to the present embodiment, the mounting member 3 is connected to the bracket 2 by passing the connecting portion 8 on the elastic shaft 41 through the connection hole 23b and using a connecting member 9. According to the present embodiment, the connecting member 9 is a flanged nut. In this case, the mounting member 3 may be connected to the bracket 2 by screwing the connecting member 9 to the connecting portion body 8b that has been passed through the connection hole 23b. Accordingly, the anti-vibration device 1A improves the spring characteristics in the left-right direction when vehicle-mounted. According to the present embodiment, the connection hole 23*b* is an elongated hole, but may be a round hole.

Further, according to the present embodiment, the elastic body 4 has two legs 44. According to the present embodiment, the two legs 44 extend in the vertical direction when vehicle-mounted. As illustrated in FIG. 1A, the two legs 44 each contact the side walls 23 when the elastic body 4 is disposed in the opening A of the bracket 2. Thus, the legs 44 of the elastic body 4 also secure the spring characteristics in the left-right direction when vehicle-mounted.

On the other hand, referring to FIG. 1B, the mounting member 3 has the circumferential wall 31 surrounding the elastic shaft 41 in the circumferential direction. According to the present embodiment, the circumferential wall 31 has a base end 31*a* that is connected to an axial side flat portion 33 of the mounting member 3. The circumferential wall 31 extends from the base end 31*a* of the circumferential wall 31 toward a bracket side in the axial direction.

Further, according to the present embodiment, the circumferential wall 31 is covered by the elastic body 4. According to the present embodiment, the elastic body 4 has a circumferential wall covering 42 that covers the circumferential wall 31. According to the present embodiment, the legs 44 are integrally formed with the circumferential wall covering 42. According to the present embodiment, a top surface 42*f* of the circumferential wall covering 42 presses against an inner surface of the bridge portion 22 of the bracket 2 when the elastic body 4 is disposed in the opening A of the bracket 2. Further, according to the present embodiment, lower surfaces 44*f* of the legs 44 press against the bottom portion 21*a* of the fixing portion 21 of the bracket 2 when the elastic body 4 is disposed in the opening A of the bracket 2. That is, the elastic body 4 is disposed in a press-fit position in the opening A of the bracket 2. Accordingly, the anti-vibration device 1A improves the spring characteristics in the vertical direction when vehicle-mounted.

Further, according to the present embodiment, the circumferential wall 31 of the mounting member 3 has one or more recesses 32 extending in the axial direction at one or more locations along the circumferential direction. In this case, when the bracket 2 and the mounting member 3 move relative to each other, such as during vehicle driving, contact between the elastic shaft 41 and the circumferential wall 31 may be avoided where the one or more recesses 32 are formed.

For example, when the spring characteristics in the axial direction are to be improved by securing a larger cross-sectional area of the elastic shaft 41 in a perpendicular-to-axial direction, the larger the cross-sectional area of the elastic shaft 41, the smaller the gap between the elastic shaft 41 and the circumferential wall 31. In such a case, the possibility of contact between the elastic shaft 41 and the circumferential wall 31 is increased. Contact between the elastic shaft 41 and the circumferential wall 31 is preferably avoided, as contact changes the spring characteristics.

Regarding this, when the one or more recesses 32 extending in the axial direction are formed at one or more locations of the circumferential wall 31 of the mounting member 3, as in the present embodiment, a large cross-sectional area of the elastic shaft 41 may be secured while avoiding contact between the elastic shaft 41 and the circumferential wall 31 of the mounting member 3. Therefore, according to the present embodiment, the spring characteristics in the axial direction may be improved by securing a large cross-sectional area of the elastic shaft 41, and while securing a large range of movement of the elastic shaft 41, contact with the mounting member may be avoided.

According to the present embodiment, the one or more recesses 32 each has a shape such that the circumferential wall 31 is connected in the circumferential direction. In this case, rigidity of the circumferential wall 31 may be adjusted by adjusting a length L32 in the axial direction of the one or more recesses 32 while avoiding contact between the elastic shaft 41 and the circumferential wall 31 of the mounting member 3.

According to the present embodiment, along the circumferential direction, the circumferential wall 31 has a portion where the one or more recesses 32 are formed and a portion where the one or more recesses 32 are not formed. According to the present embodiment, among tip ends of the circumferential wall 31 (bracket side ends in the axial direction) a tip end 31*b* of the circumferential wall 31 of a portion of the circumferential wall 31 where the one or more recesses 32 are not formed is positioned more toward the bracket side in the axial direction than a tip end 31*c* (bottom of the one or more recesses 32) of the circumferential wall 31 where the one or more recesses 32 are formed. In other words, according to the present embodiment, a length Lb in the axial direction between the base end 31*a* and the tip end 31*b* of the circumferential wall 31 is longer than a length Lc in the axial direction between the base end 31*a* and the tip end 31*c* of the circumferential wall 31. In this case, rigidity of the circumferential wall 31 may be adjusted by adjusting the length L32 in the axial direction of the one or more recesses 32 while avoiding contact between the elastic shaft 41 and the circumferential wall 31 of the mounting member 3.

Further, according to the present embodiment, at least one of the one or more recesses 32 is disposed opposite the fixing portion 21 of the bracket 2 with the elastic shaft 41 therebetween. In this case, contact between the elastic shaft 41 and the circumferential wall 31 of the mounting member 3 may be avoided at the position opposite the fixing portion 21 of the bracket 2 with the elastic shaft 41 therebetween. According to the present embodiment, when the anti-vibration device 1A is mounted on a vehicle, the at least one of the one or more recesses 32 is disposed at a position in the upward direction when vehicle-mounted. Thus, according to the present embodiment, contact between the elastic shaft 41 and the circumferential wall 31 of the mounting member 3 may be avoided at the position in the upward direction when vehicle-mounted.

Further, according to the present embodiment, the anti-vibration device 1A further has the elastic body 4. According to the present embodiment, the elastic shaft 41 is integrally formed with the elastic body 4. Further, the elastic body 4 covers the circumferential wall 31 and the one or more recesses 32 of the mounting member 3. Further, according to the present embodiment, the bracket 2 and the mounting member 3 are fitted to each other via the elastic body 4. In this case, the elastic shaft 41 is integrally formed with the elastic body 4 fitted between the bracket 2 and the mounting member 3, thus simplifying the overall configuration of the anti-vibration device 1A. Further, in this case, the circumferential wall 31 and the one or more recesses 32 of the mounting member 3 are covered by the elastic body 4, and therefore even when the elastic shaft 41 contacts the circumferential wall 31 of the mounting member 3, the impact at the time of contact may be mitigated. Therefore, in this case, the overall configuration of the anti-vibration device 1A is simplified while also mitigating the impact at the time of contact between the elastic shaft 41 and the circumferential wall 31 of the mounting member 3 when, for example, an excessive load is applied.

According to the present embodiment, the circumferential wall 31 and the one or more recesses 32 of the mounting member 3 are covered by the circumferential wall covering 42 of the elastic body 4. Further, according to the present embodiment, the axial side flat portion 33 of the mounting member 3 is covered by the axial side flat covering 43 of the elastic body 4. Further, according to the present embodiment, the circumferential wall covering 42 is integrally formed with the elastic shaft 41 via the axial side flat covering 43. Further, according to the present embodiment, the circumferential wall covering 42 is integrally formed with the legs 44. Further, according to the present embodiment, the bracket 2 and the mounting member 3 are tightly fitted together via the elastic body 4, which is press-fitted into the opening A of the bracket 2.

Figure 2A:
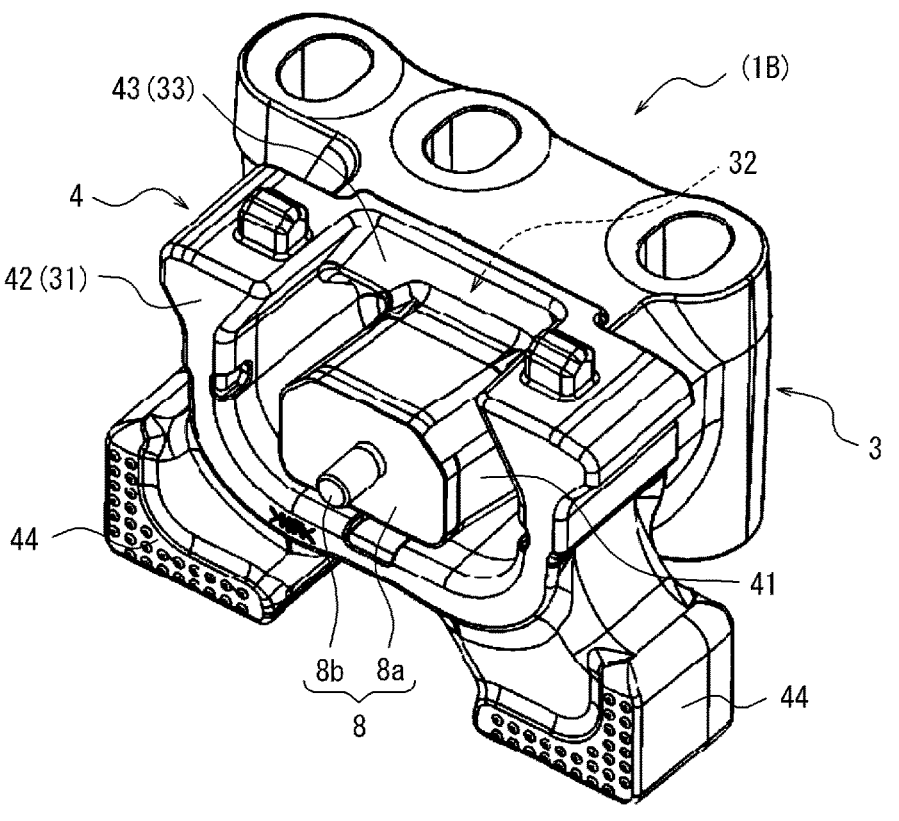
FIG. 2A is a perspective view schematically illustrating the mounting member with the elastic body of the anti-vibration device according to a second embodiment of the present disclosure.

FIG. 2A is a perspective view schematically illustrating the mounting member 3 with the elastic body of an anti-vibration device 1B according to a second embodiment of the present disclosure. In the following description, description of the bracket 2 is omitted. A bracket similar to that used in the anti-vibration device 1A may be used as the bracket 2 according to the present embodiment.

Figure 2B:
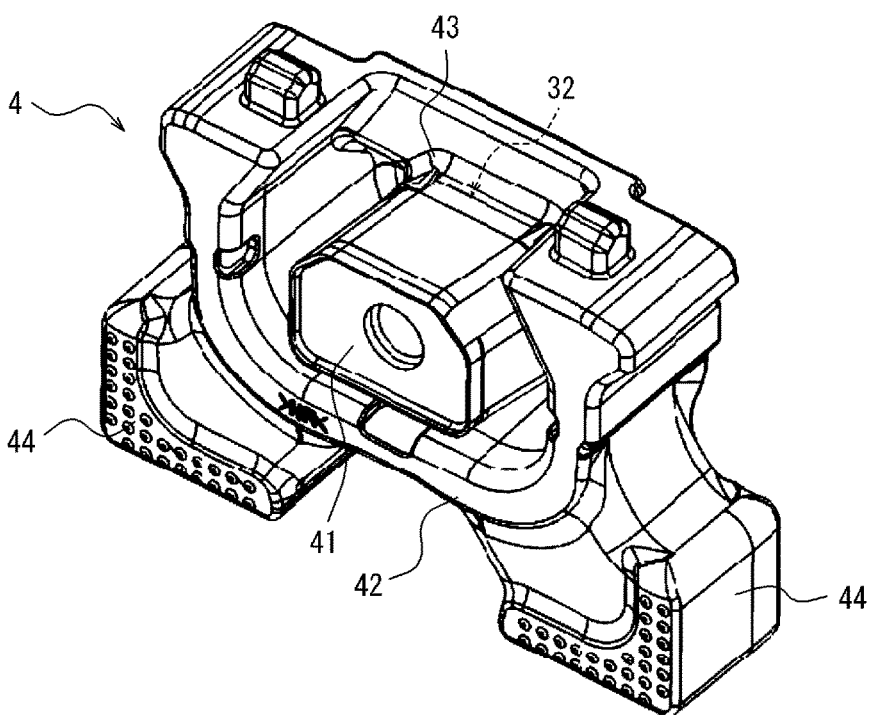
FIG. 2B is a perspective view illustrating the elastic body of FIG. 2A.
Figure 2C:
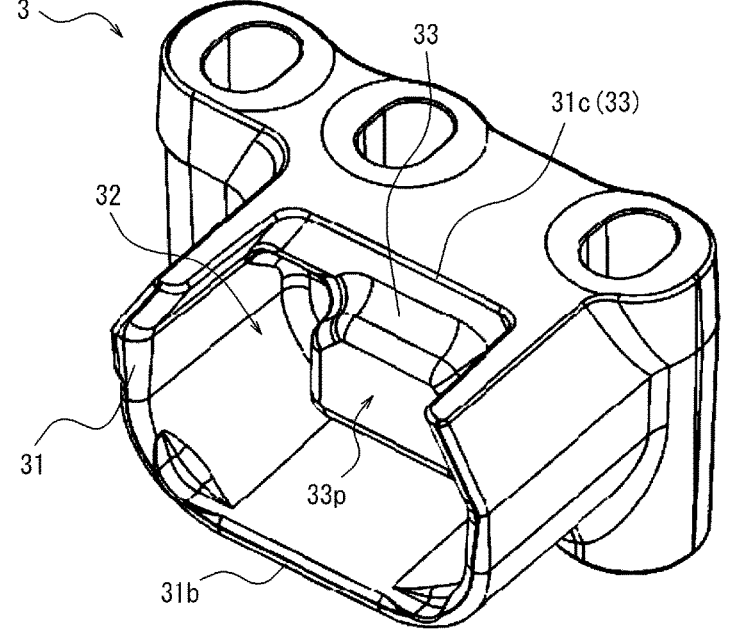
FIG. 2C is a perspective view illustrating the mounting member of FIG. 2A.

FIG. 2A illustrates the mounting member 3 integrally formed with the elastic body 4. According to the present embodiment, the elastic body 4 may be integrally formed with the mounting member 3, as in the anti-vibration device 1A. Alternatively, the mounting member 3 and the elastic body 4 may be formed separately and assembled. FIG. 2B illustrates the elastic body 4 according to the present embodiment. FIG. 2C illustrates the mounting member 3 according to the present embodiment.

According to the present embodiment, one recess 32 is disposed opposite the fixing portion 21 of the bracket 2 with the elastic shaft 41 therebetween, as in the anti-vibration device 1A. That is, like the anti-vibration device 1A, the present embodiment also avoids contact between the elastic shaft 41 and the circumferential wall of the mounting member 3 at the position in the upward direction when vehicle-mounted.

Further, according to the present embodiment, in the mounting member 3, the recess 32 has a shape such that the circumferential wall 31 is divided along the circumferential direction. In this case, contact between the elastic shaft 41 and the circumferential wall 31 of the mounting member 3 may be avoided more effectively.

Referring to FIG. 2C, in the mounting member 3, the bottom 31*c* of the recess 32 coincides with the axial side flat portion 33. In this case, the circumferential wall 31, extending from the axial side flat portion 33, is completely divided at the recess 32. In this case, contact between the elastic shaft 41 and the circumferential wall 31 of the mounting member 3 may be avoided more effectively.

Figure 2D:
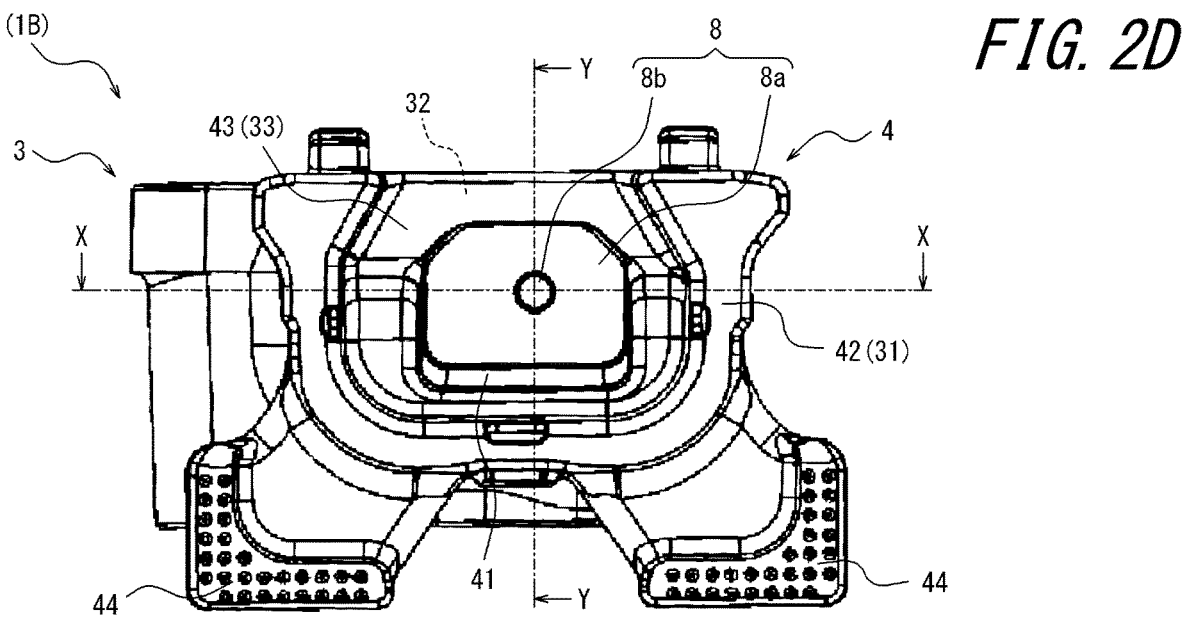
FIG. 2D is a side view schematically illustrating the mounting member with the elastic body of FIG. 2A.
Figures 2E, 2F:
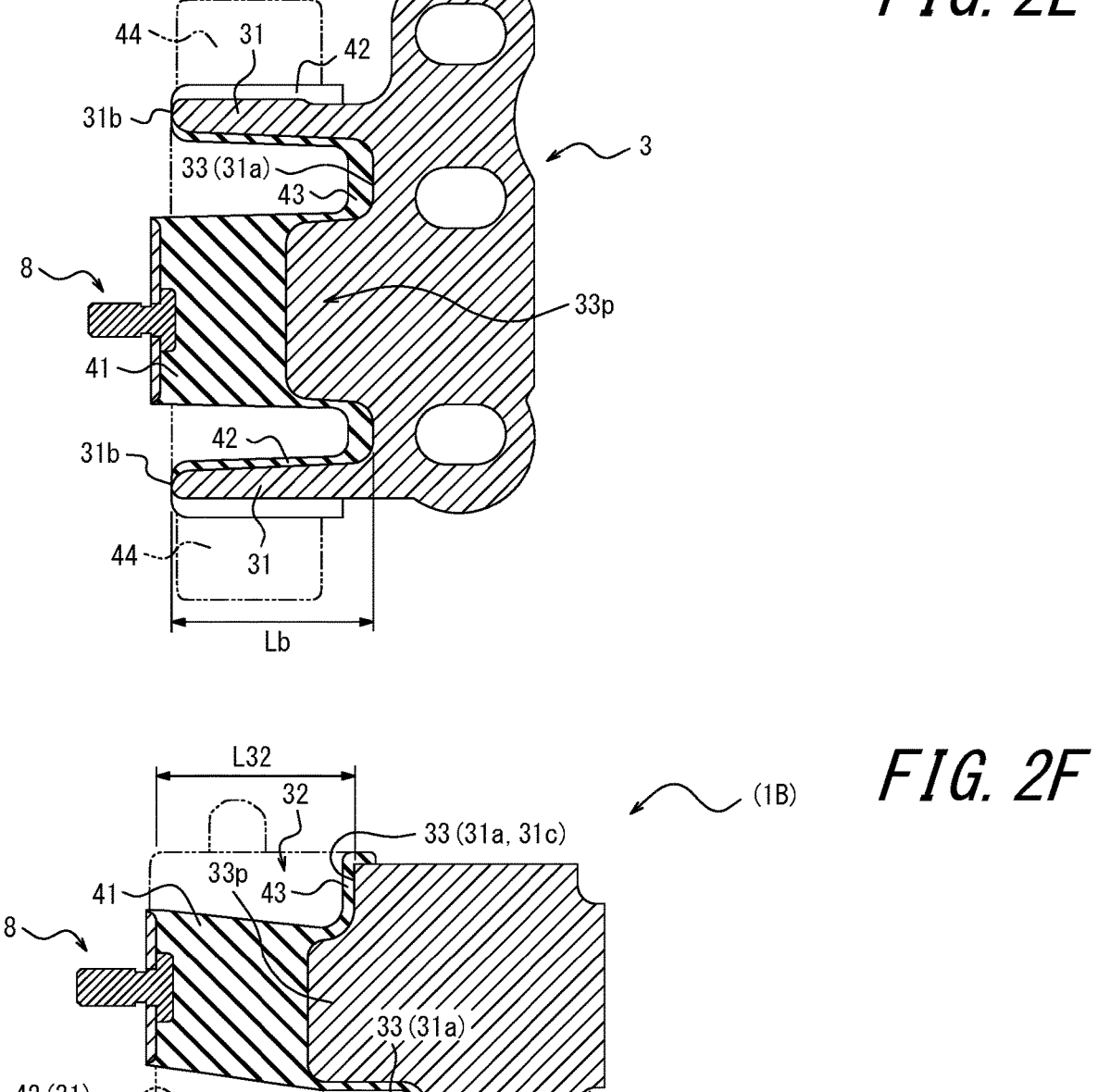
FIG. 2E is an X-X cross-sectional view of FIG. 2D.
FIG. 2F is a Y-Y cross-sectional view of FIG. 2D.

FIG. 2D is a schematic side view of FIG. 2A. That is, FIG. 2D illustrates FIG. 2A from the left-right direction when vehicle-mounted when the anti-vibration device 1B is mounted on a vehicle. Further, FIG. 2E is an X-X cross-sectional view of FIG. 2D. Further, FIG. 2F is a Y-Y cross-sectional view of FIG. 2D.

Referring to FIG. 2E, when the elastic shaft 41 moves (tilts) starting from the mounting member 3 in the fixing portion extension direction of the anti-vibration device 1B, the circumferential wall 31 is able to maintain a stopper function against the movement of the elastic shaft 41. According to the present embodiment, when the anti-vibration device 1B is mounted on a vehicle, the circumferential wall 31 is able to function as a stopper for the elastic shaft 41 in the front-rear direction when vehicle-mounted.

On the other hand, referring to FIG. 2F, when the elastic shaft 41 moves (tilts) to one side starting from the mounting member 3 in a direction perpendicular to the axial direction and the fixing portion extension direction of the anti-vibration device 1B, the circumferential wall 31 is able to maintain a stopper function against the movement of the elastic shaft 41. According to the present embodiment, when the anti-vibration device 1B is mounted on a vehicle the circumferential wall 31 is able to function as a stopper for the elastic shaft 41 in the downward direction when vehicle-mounted.

In contrast, referring to FIG. 2F, when the elastic shaft 41 moves (tilts) to the other side starting from the mounting member 3 in a direction perpendicular to the axial direction of the anti-vibration device 1B and the fixing portion extension direction, the recess 32 does not interfere with the movement of the elastic shaft 41. According to the present embodiment, when the anti-vibration device 1B is mounted on a vehicle, the recess 32 is disposed in the upward direction when vehicle-mounted. Accordingly, when the anti-vibration device 1B is mounted on the vehicle, the elastic shaft 41 is able to move without interference from the circumferential wall 31 in the upward direction when vehicle-mounted.

Therefore, according to the anti-vibration device 1B, as in the anti-vibration device 1A, a large cross-sectional area of the elastic shaft 41 may be secured while avoiding contact between the elastic shaft 41 and the mounting member 3. In particular, according to the present embodiment, the recess 32 has a shape such that the circumferential wall 31 is divided in the circumferential direction. In this case, contact between the elastic shaft 41 and the circumferential wall 31 of the mounting member 3 may be avoided more effectively.

According to the present embodiment, the axial side flat portion 33 of the mounting member 3 has a protrusion 33*p* that protrudes in the axial direction. The elastic shaft 41 is disposed on the protrusion 33P. However, the axial side flat portion 33 may consist of a flat surface. Further, according to the present embodiment, the elastic shaft 41 is formed so that the tip thereof (connecting portion 8 side) is inclined toward the upward direction when vehicle-mounted. However, the direction of inclination of the elastic shaft 41 may be determined, for example, according to a static load received from the engine when the anti-vibration device 1B is assembled in a vehicle. Further, the elastic shaft 41 may be arranged parallel to the axial direction. Further, the circumferential wall covering 42 may be locally intermittent, as illustrated in FIG. 2F.

Figure 3A:
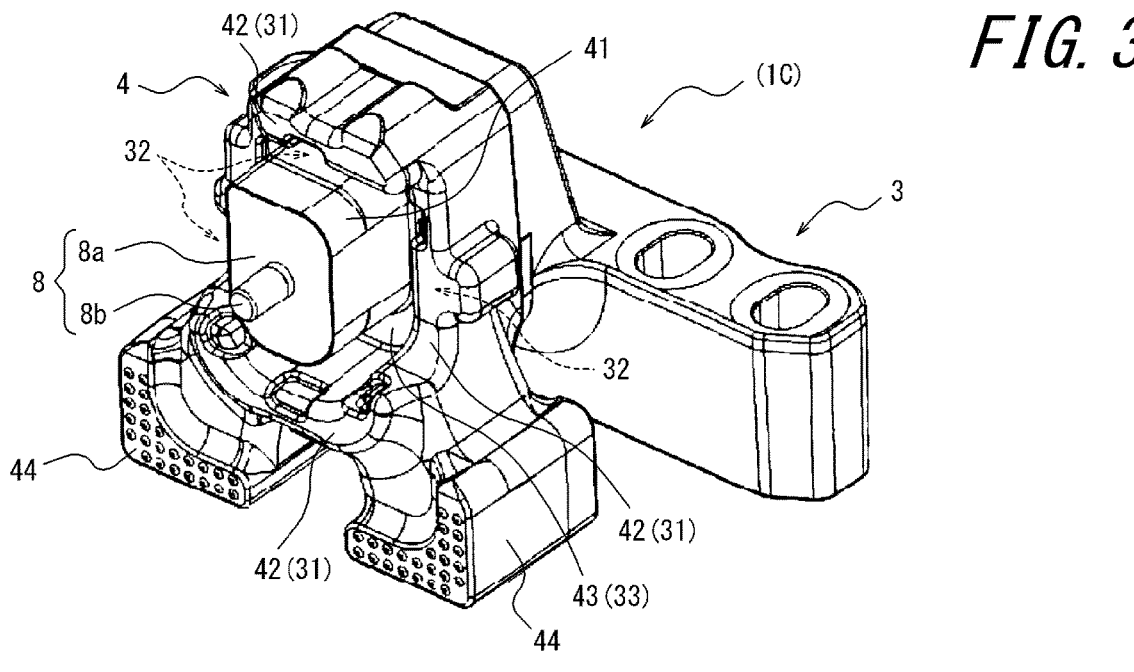
FIG. 3A is a perspective view schematically illustrating the mounting member with the elastic body of the anti-vibration device according to a third embodiment of the present disclosure.

FIG. 3A is a perspective view schematically illustrating the mounting member 3 with elastic body of an anti-vibration device 1C according to a third embodiment of the present disclosure. Again, in the following description, description of the bracket 2 is omitted, as in the anti-vibration device 1B.

Figure 3B:
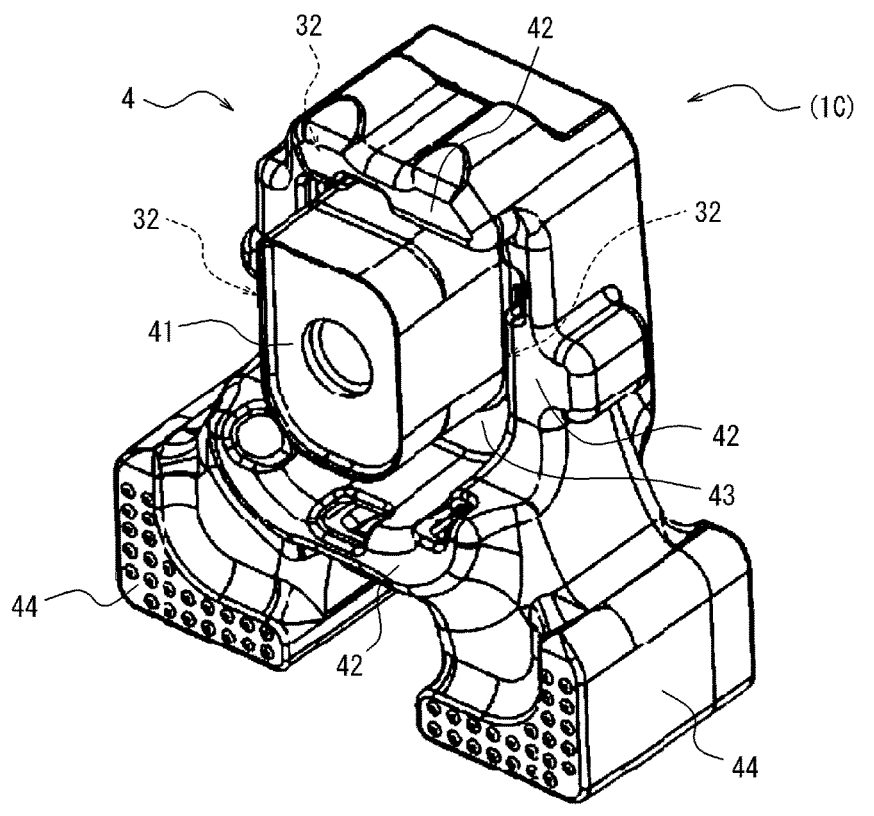
FIG. 3B is a perspective view illustrating the elastic body of FIG. 3A.
Figure 3C:
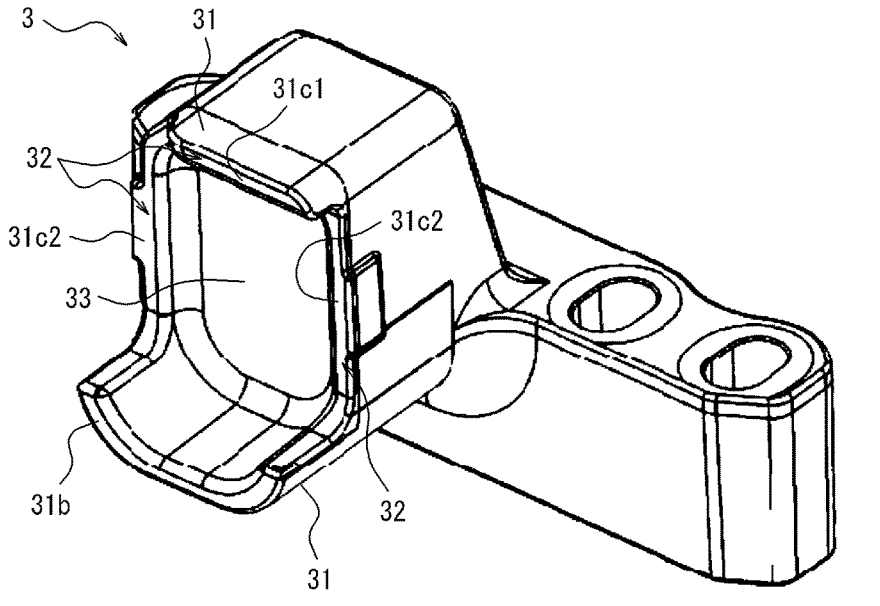
FIG. 3C is a perspective view illustrating the mounting member of FIG. 3A.

FIG. 3A illustrates the mounting member 3 integrally formed with the elastic body 4. According to the present embodiment, the elastic body 4 may be integrally formed with the mounting member 3, as in the anti-vibration device 1A. Alternatively, the mounting member 3 and the elastic body 4 may be formed separately and assembled. FIG. 3B illustrates the elastic body 4 according to the present embodiment. FIG. 3C illustrates the mounting member 3 according to the present embodiment.

According to the present embodiment, the one or more recesses 32 each has a shape such that the circumferential wall 31 is connected in the circumferential direction, as in the anti-vibration device 1A. That is, according to the present embodiment, the circumferential wall 31 has an annular form all the way around the circumferential direction, as in the anti-vibration device 1A.

According to the present embodiment, at least one of the one or more recesses 32 is disposed opposite the fixing portion 21 of the bracket 2 with the elastic shaft 41 therebetween, as in the anti-vibration device 1A. That is, like the anti-vibration device 1A, the present embodiment also avoids contact between the elastic shaft 41 and the circumferential wall 31 of the mounting member 3 at the position in the upward direction when vehicle-mounted.

Further, referring to FIG. 3A, according to the present embodiment, the at least one of the one or more recesses 32 is disposed at locations opposite each other across the elastic shaft 41 in the fixing portion extension direction of the bracket 2. In this case, contact between the elastic shaft 41 and the circumferential wall 31 of the mounting member 3 may be avoided in the fixing portion extension direction of the bracket 2. According to the present embodiment, when the anti-vibration device 1C is mounted on a vehicle, the at least one of the one or more recesses 32 is disposed at positions in the front-rear direction when vehicle-mounted, in addition to one at the position in the upward direction when vehicle-mounted. Therefore, according to the present embodiment, contact between the elastic shaft 41 and the circumferential wall 31 of the mounting member 3 may be avoided even at the positions in the front-rear direction when vehicle-mounted.

Figure 3D:
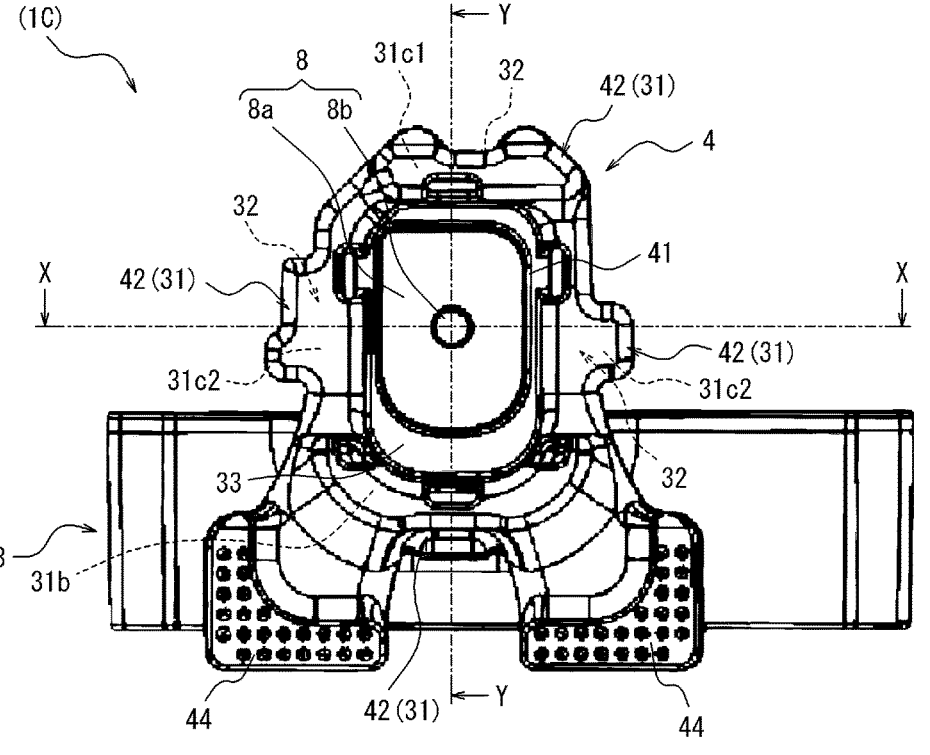
FIG. 3D is a side view schematically illustrating the mounting member with the elastic body of FIG. 3A.
Figure 3E:
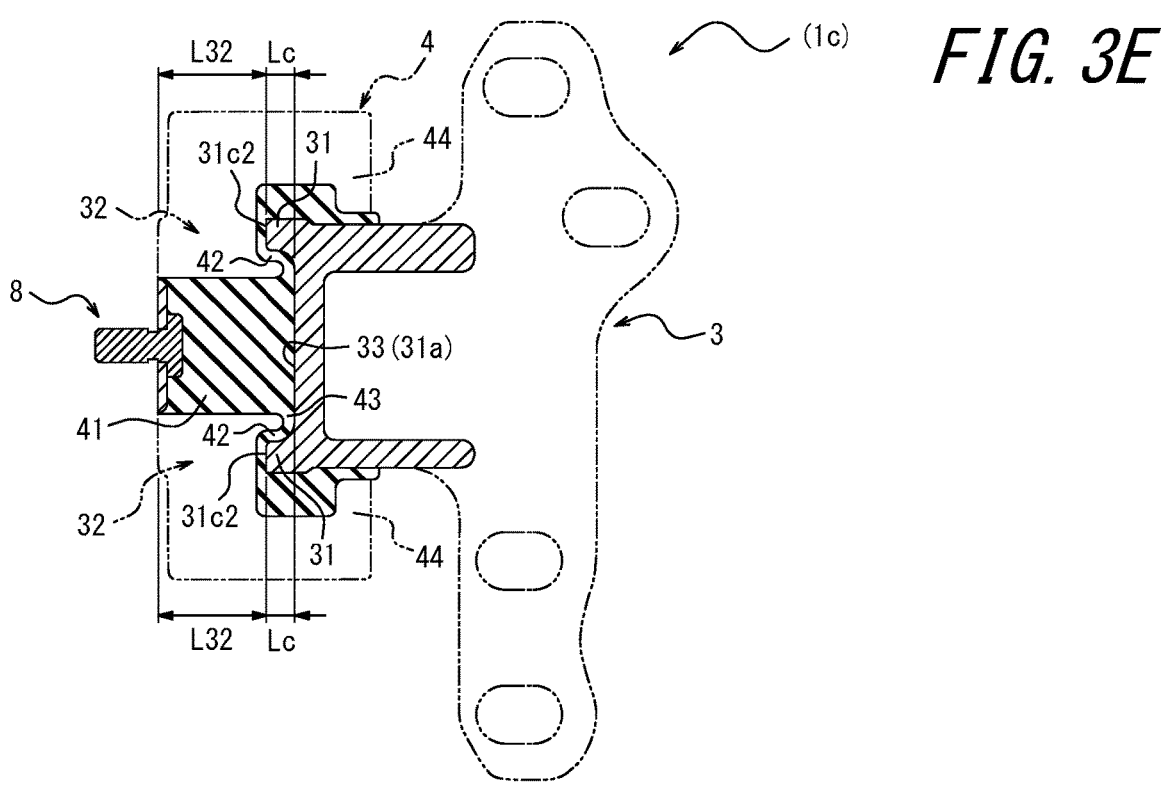
FIG. 3E is an X-X cross-sectional view of FIG. 3D.

FIG. 3D is a schematic side view of FIG. 3A. That is, FIG. 3D illustrates FIG. 3A from the left-right direction when vehicle-mounted when the anti-vibration device 1C is mounted on a vehicle. Further, FIG. 3E is an X-X cross-sectional view of FIG. 3D. Further, FIG. 3F is a Y-Y cross-sectional view of FIG. 3D.

Referring to FIG. 3E, when the elastic shaft 41 moves (tilts) starting from the mounting member 3 in the fixing portion extension direction of the anti-vibration device 1C, the one or more recesses 32 do not interfere with the movement of the elastic shaft 41. According to the present embodiment, when the anti-vibration device 1C is mounted on a vehicle, the elastic shaft 41 is able to move without interference from the circumferential wall 31 in the front-rear direction when vehicle-mounted.

Figure 3F:
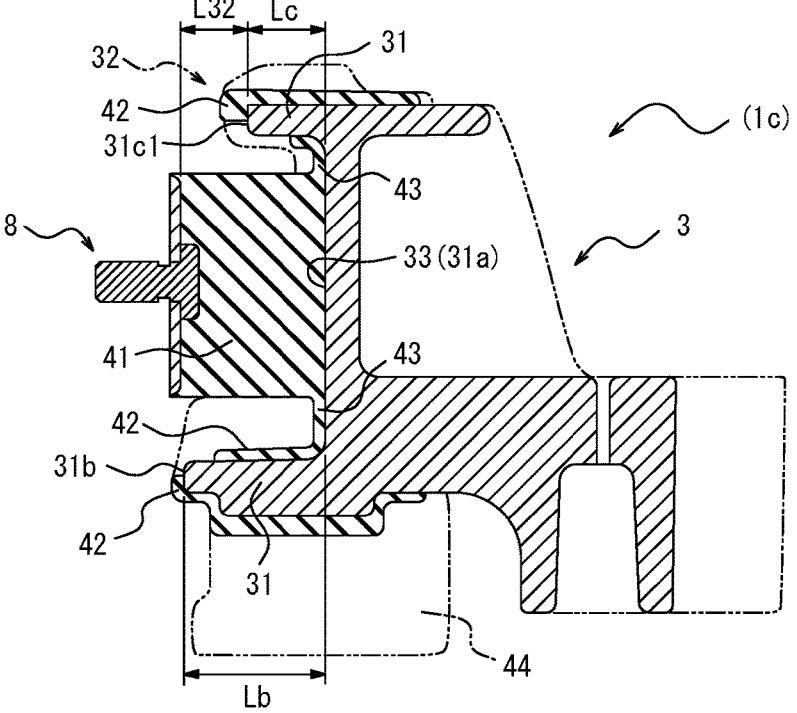
FIG. 3F is a Y-Y cross-sectional view of FIG. 3D.

Further, referring to FIG. 3F, when the elastic shaft 41 moves (tilts) to one side starting from the mounting member 3 in a direction perpendicular to the axial direction and the fixing portion extension direction of the anti-vibration device 1C, the one or more recesses 32 do not hinder the movement of the elastic shaft 41. According to the present embodiment, when the anti-vibration device 1C is mounted on a vehicle, the elastic shaft 41 is able to move without interference from the circumferential wall 31 in the upward direction when vehicle-mounted.

In contrast, at locations where the one or more recesses 32 are not present (for example, at locations on the other side of the anti-vibration device 1C in a direction perpendicular to the axial direction and the fixing portion extension direction), the circumferential wall 31 is able to maintain a stopper function against the movement of the elastic shaft 41. According to the present embodiment, when the anti-vibration device 1C is mounted on a vehicle, the movement of the elastic shaft 41 is regulated in the downward direction when vehicle-mounted.

Therefore, according to the anti-vibration device 1B, as in the anti-vibration device 1A, a large cross-sectional area of the elastic shaft 41 may be secured while avoiding contact between the elastic shaft 41 and the mounting member 3.

Referring to FIG. 3E, according to the present embodiment, the tip ends 31*c* of the circumferential wall 31 (bottom of the recess 32) in the front-rear direction when vehicle-mounted are indicated by the reference sign 31*c*2. Further, referring to FIG. 3F, according to the present embodiment, the tip end 31*c* of the circumferential wall 31 (bottom of the recess 32) in the upward direction when vehicle-mounted is indicated by the reference sign 31*c*1. Comparing FIG. 3E and FIG. 3F, according to the present embodiment, the length L32 of the recess 32 in the front-rear direction when vehicle-mounted is longer than the length L32 of the recess 32 in the upward direction when vehicle-mounted. This configuration prioritizes movement in the front-rear direction of the vehicle (for example, sudden acceleration, sudden deceleration). However, when there is a plurality of the recesses 32, the length L32 of the recesses 32 may be set as large or small as desired. Further, where there is a plurality of the recesses 32, the length L32 of the recesses 32 may be the same. That is, when there is a plurality of the recesses 32, the length L32 of each of the recesses 32 may be set as desired. Further, the axial side flat portion 33 of the mounting member 3 is configured as a flat surface, but the protrusion 33*p* may be formed on the axial side flat portion 33, as in the anti-vibration device 1B.

As described above, according to each embodiment of the present disclosure, the anti-vibration device is provided that is able to secure a large cross-sectional area of the elastic shaft 41 while avoiding contact between the elastic shaft 41 and the mounting member 3.

The above description is only of example embodiments of the present disclosure, and various modifications are possible according to the scope of the claims. For example, each of the above embodiments has at least one of the one or more recesses 32 set at the base of the circumferential wall 31 in the upward direction when vehicle-mounted. This is because in each of the above embodiments, the mounting member 3 is supported via the legs 44 of the elastic body 4. However, according to the present disclosure, the one or more recesses 32 may be formed in the circumferential wall 31 in the downward direction when vehicle-mounted. Further, the one or more recesses 32 may be formed in any one of the four directions, in the front-rear and left-right directions when vehicle-mounted. Further, the one or more recesses 32 may be formed at a position in a direction other than any one of the above four directions. Further, according to the present disclosure, when there is a plurality of the recesses 32, one or more of the recesses 32 may have a shape such that the circumferential wall 31 is divided along the circumferential direction and one or more of the recesses 32 may have a shape such that the circumferential wall 31 is connected along the circumferential direction. Further, each of the above embodiments describes an example where the circumferential wall 31 and the one or more recesses 32 are covered by the elastic body 4, but the circumferential wall 31 and the one or more recesses 32 need not be covered by the elastic body 4. Further, the present disclosure includes cases where the circumferential wall 31 includes an annular circumferential wall surrounding the elastic shaft 41 all the way around and where a plurality of (circumferential) walls surround the elastic shaft 41 intermittently along the circumferential direction. Here, the plurality of (circumferential) walls are spaced out along the circumferential direction. Further, the various configurations adopted in each of the above-mentioned embodiments may be replaced with each other or combined as appropriate.

REFERENCE SIGNS LIST

1A-1C: Anti-vibration device, 2: Bracket, 21: Fixing portion, 22: Bridge portion, 3: Mounting member, 31: Circumferential wall, 31*a*: Base end of circumferential wall, 31*b*: Tip end of circumferential wall, 32: One or more recesses, 33: Axial side flat portion, 4: Elastic body, 41: Elastic shaft, 42: Circumferential wall covering, 43: Axial side flat covering, 44: Legs, A: Opening, O: Extension direction axis of opening

The invention claimed is:

1. An anti-vibration device comprising:
a bracket having a fixing portion that is fixable to either one of a vibration generator and a vibration receiver, and a bridge portion that together with the fixing portion forms an opening;
a mounting member that is mountable to the other of the vibration generator and the vibration receiver, and is mounted in the opening formed in the bracket; and
an elastic shaft that is mounted to the mounting member and extends in an axial direction inside the opening, wherein
the mounting member has a circumferential wall surrounding the elastic shaft in a circumferential direction, and
an upper end of the circumferential wall has a portion where one or more recesses extending in the axial direction are formed and the rest of circumferential wall besides the upper end having a portion where the one or more recesses are not formed along the circumferential direction.

2. The anti-vibration device according to claim 1, wherein the one or more recesses include a recess having a shape such that the circumferential wall is divided along the circumferential direction.

3. The anti-vibration device according to claim 2, wherein the one or more recesses include a recess having a shape such that the circumferential wall is connected along the circumferential direction.

4. The anti-vibration device according to claim 3, wherein the one or more recesses are disposed at locations opposite each other across the elastic shaft in a direction of extension of the fixing portion of the bracket.

5. The anti-vibration device according to claim 3, wherein the one or more recesses are disposed opposite the fixing portion of the bracket with the elastic shaft interposed therebetween.

6. The anti-vibration device according to claim 3, further comprising an elastic body that is integrally formed with the elastic shaft and covers the circumferential wall and the one or more recesses, wherein
the bracket and the mounting member are fitted to each other via the elastic body.

7. The anti-vibration device according to claim 2, wherein the one or more recesses are disposed at locations opposite each other across the elastic shaft in a direction of extension of the fixing portion of the bracket.

8. The anti-vibration device according to claim 7, wherein the one or more recesses are disposed opposite the fixing portion of the bracket with the elastic shaft interposed therebetween.

9. The anti-vibration device according to claim 2, wherein the one or more recesses are disposed opposite the fixing portion of the bracket with the elastic shaft interposed therebetween.

10. The anti-vibration device according to claim 2, further comprising an elastic body that is integrally formed with the elastic shaft and covers the circumferential wall and the one or more recesses, wherein
the bracket and the mounting member are fitted to each other via the elastic body.

11. The anti-vibration device according to claim 1, wherein the one or more recesses include a recess having a shape such that the circumferential wall is connected along the circumferential direction.

12. The anti-vibration device according to claim 11, wherein the one or more recesses are disposed at locations opposite each other across the elastic shaft in a direction of extension of the fixing portion of the bracket.

13. The anti-vibration device according to claim 11, wherein the one or more recesses are disposed opposite the fixing portion of the bracket with the elastic shaft interposed therebetween.

14. The anti-vibration device according to claim 11, further comprising an elastic body that is integrally formed with the elastic shaft and covers the circumferential wall and the one or more recesses, wherein
the bracket and the mounting member are fitted to each other via the elastic body.

15. The anti-vibration device according to claim 1, wherein the one or more recesses are disposed at locations opposite each other across the elastic shaft in a direction of extension of the fixing portion of the bracket.

16. The anti-vibration device according to claim 15, wherein the one or more recesses are disposed opposite the fixing portion of the bracket with the elastic shaft interposed therebetween.

17. The anti-vibration device according to claim 15, further comprising an elastic body that is integrally formed with the elastic shaft and covers the circumferential wall and the one or more recesses, wherein
the bracket and the mounting member are fitted to each other via the elastic body.

18. The anti-vibration device according to claim 1, wherein the one or more recesses are disposed opposite the fixing portion of the bracket with the elastic shaft interposed therebetween.

19. The anti-vibration device according to claim 18, further comprising an elastic body that is integrally formed with the elastic shaft and covers the circumferential wall and the one or more recesses, wherein
the bracket and the mounting member are fitted to each other via the elastic body.

20. The anti-vibration device according to claim 1, further comprising an elastic body that is integrally formed with the elastic shaft and covers the circumferential wall and the one or more recesses, wherein
the bracket and the mounting member are fitted to each other via the elastic body.

* * * * *